(12) United States Patent
Pavani

(10) Patent No.: US 11,731,282 B2
(45) Date of Patent: Aug. 22, 2023

(54) DISH HANDLING ROBOT

(71) Applicant: Sri Rama Prasanna Pavani, San Carlos, CA (US)

(72) Inventor: Sri Rama Prasanna Pavani, San Carlos, CA (US)

(73) Assignee: Dishcare Inc., San Carlos, CA (US)

(*) Notice: Subject to any disclaimer, the term of this patent is extended or adjusted under 35 U.S.C. 154(b) by 428 days.

(21) Appl. No.: 17/191,695

(22) Filed: Mar. 3, 2021

(65) Prior Publication Data
US 2022/0281118 A1    Sep. 8, 2022

(51) Int. Cl.
*B25J 15/08*    (2006.01)
*B25J 11/00*    (2006.01)
*B25J 17/02*    (2006.01)

(52) U.S. Cl.
CPC ........... *B25J 11/0085* (2013.01); *B25J 15/08* (2013.01); *B25J 17/025* (2013.01)

(58) Field of Classification Search
CPC ...... B25J 11/0085; B25J 15/08; B25J 17/025; B25J 15/0014; B25J 15/0028; B25J 15/0052; B25J 19/023
USPC ................................ 294/86.4, 213
See application file for complete search history.

(56) References Cited

U.S. PATENT DOCUMENTS

| | | | |
|---|---|---|---|
| 7,269,479 B2 | 9/2007 | Okamoto et al. | |
| 8,287,017 B2 * | 10/2012 | Koyama | B25J 15/08 901/31 |
| 8,612,048 B2 * | 12/2013 | Meyrahn | A22C 15/001 700/250 |
| 9,815,198 B2 * | 11/2017 | Davis | B25J 9/1697 |
| 10,507,584 B2 * | 12/2019 | Peters | B25J 9/1697 |
| 10,562,193 B2 * | 2/2020 | Birkmeyer | B66C 1/06 |
| 10,589,949 B2 * | 3/2020 | Peters | B25J 15/0052 |
| 10,632,617 B2 * | 4/2020 | Takeyama | B25J 15/0253 |
| 10,817,764 B2 * | 10/2020 | Xi | G06V 30/224 |
| 10,875,726 B2 * | 12/2020 | Inomata | B25J 9/042 |
| 11,040,453 B2 * | 6/2021 | Hino | B25J 5/007 |
| 11,220,010 B2 * | 1/2022 | Negishi | B25J 13/082 |
| 2007/0216179 A1 * | 9/2007 | Hirooka | H01L 21/68707 294/103.1 |
| 2018/0036889 A1 | 2/2018 | Birkmeyer et al. | |

FOREIGN PATENT DOCUMENTS

CN    108354564 A    8/2018

* cited by examiner

*Primary Examiner* — Paul T Chin

(57) ABSTRACT

A system and method for handling a dish, comprising: inserting a tapered finger between said dish which is stacked together with another dish; gripping said dish using an end effector having at least two fingers, wherein the distance of separation between said two fingers is configurable; moving said end effector to a plurality of locations using a first rotary arm connected to a second rotary arm, wherein said second rotary arm is connected to said end effector, and said first and second rotary arms rotate about axes that are parallel to each other; moving said first rotary arm at two or more heights using a height arm connected to said first rotary arm, whereby said robot can pick up, hold and drop off said dish.

20 Claims, 24 Drawing Sheets

DISH HANDLING ROBOT

FIELD OF THE INVENTION

This invention relates generally to a robot for handling a reusable dish.

BACKGROUND

People find loading dishes into a dishwasher painful because it requires repeated bending to transfer dishes from a kitchen sink or countertop to a dishwasher which is typically located at a substantially lower height.

Handling dishes requires a number of careful skills. Firstly, it requires the ability to pick up, hold, and drop off a variety of dish types such as plates, bowls, cups, mugs, pots, pans, trays, spoons, forks, knives, chopsticks, etc. Secondly, dishes such as plates and bowls are often stacked to maximize space efficiency, so handling such stackable dishes requires the ability to pick up, hold, and drop off a dish that is stacked together with another dish. Thirdly, handling dishes requires the ability to pickup, hold or drop off a dish deep inside one of many cabinets which may be vertically or horizontally arranged, or otherwise in close proximity. Finally, handling dishes may also require the ability to tilt or turn a dish to a specific angle (for example, upside down).

Conventional robotic arms do not have the complex skills listed above for handling reusable dishes. Such conventional robotic arms are typically best suited for moving an independent object of a single type in an otherwise open unobstructed environment.

Accordingly, there is a need for an improved system and method to handle a reusable dish. One that could pick up, hold, and drop off a variety of dish types; one that could pick up, hold, and drop off a stacked dish; one that could pick up, hold, and drop off a dish deep inside one of many cabinets which may be vertically or horizontally arranged, or otherwise in close proximity.

SUMMARY

The invention is a system and method for robotic handling of a reusable dish.

In some embodiments, the invention is a robot for handling a dish, comprising: a tapered finger for picking up said dish which is stacked together with another dish, wherein said tapered finger is inserted between said dish and said another dish; an end effector having at least two fingers, wherein the distance of separation between said two fingers is configured to grip said dish; a first rotary arm connected to a second rotary arm, wherein said second rotary arm is connected to said end effector, and said first rotary arm and said second rotary arm rotate about axes that are parallel to each other in order to move said end effector to a plurality of locations; a height arm connected to said first rotary arm, wherein said height arm can be configured to position said first rotary arm at two or more heights, whereby said robot can pick up, hold and drop off said dish.

In some embodiments, the invention is a method for handling a dish, comprising: inserting a tapered finger between said dish which is stacked together with another dish; gripping said dish using an end effector having at least two fingers, wherein the distance of separation between said two fingers is configurable; moving said end effector to a plurality of locations using a first rotary arm connected to a second rotary arm, wherein said second rotary arm is connected to said end effector, and said first and second rotary arms rotate about axes that are parallel to each other; moving said first rotary arm at two or more heights using a height arm connected to said first rotary arm, whereby said robot can pick up, hold and drop off said dish.

DETAILED DESCRIPTION OF THE PREFERRED EMBODIMENTS

Figure 1:
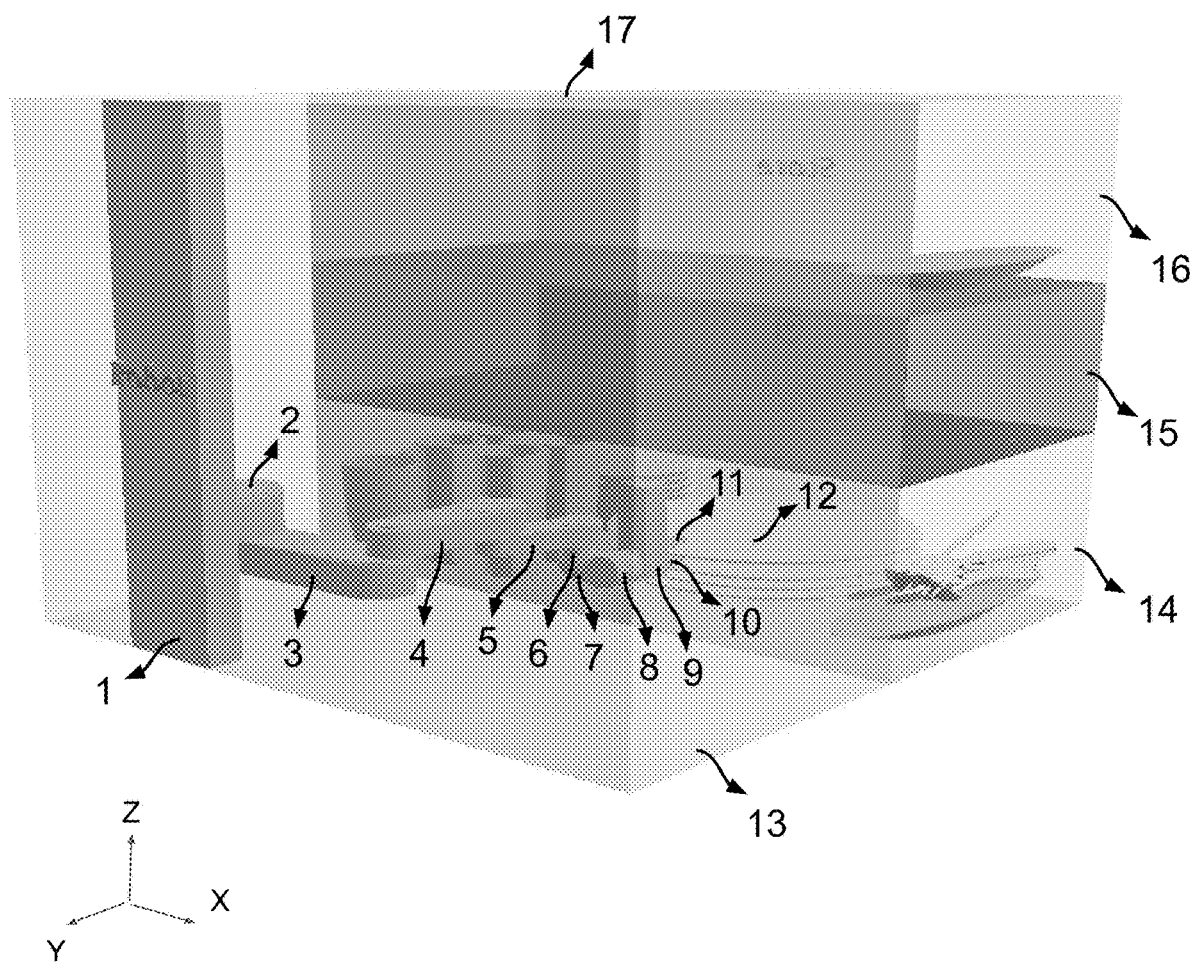
FIG. 1 shows a three-dimensional view of a dish handling robot picking up a stacked plate from a cabinet, in accordance with the invention.

FIG. 1. shows a three-dimensional view of a dish handling robot 13 picking up a stacked plate 12 from a cabinet 14, in accordance with the invention. Robot 13 is designed to pick up, hold, and drop off a dish. A dish is an article that makes contact with a food or a drink while preparing, serving, consuming, or storing of the food or the drink. For example, dishes include flatware, plates, bowls, cups, and mugs. Flatware includes spoons, forks, knives, and chopsticks. Dishes further include pots, pans, trays, and other kitchen utensils used for preparing, serving, or storing food.

Robot 13 comprises a tapered finger 10 for picking up the dish 12 which is stacked together with another dish, wherein the tapered finger is inserted between dish 12 and the other dish with which it is stacked. Robot 13 also comprises an end effector 9 having at least two fingers 10 and 11, wherein the distance of separation between the two fingers 10 and 11 is configured to grip dish 12. The thickness of tapered finger 10 at the tip of the finger is smaller than the thickness of the finger near the end effector 9. Robot 13 also comprises a first rotary arm 4 connected to a second rotary arm 5, wherein the second rotary arm 5 is connected to end effector 9. The first rotary arm 4 and the second rotary arm 5 rotate about axes that are parallel to each other in order to move the end effector 9 to a plurality of locations inside cabinet 14. Robot 13 also comprises a height arm 1 connected to the first rotary arm 4, wherein the height arm 1 can be configured to position the first rotary arm 4 at two or more heights.

In some embodiments, the first rotary arm 4 is connected to height arm 1 through one or more rotary arms 3. In some embodiments, the height arm 1 moves an arm 2 vertically. In some embodiments, the intersection region of arm 2 and arm 3 comprises a motor to rotate arm 2. Similarly, in some embodiments, the intersection region of arm 3 and arm 4 comprises a motor to rotate arm 4. In some embodiments, the intersection region of arm 4 and arm 5 comprises a motor to rotate arm 5.

In some embodiments, robot 13 and a collection of cabinet modules 14, 15, and 16 form a comprehensive dish cleaner system 17, having the capability to load, wash, and store dishes. In some embodiments, robot 13 further comprises a wrist 6, 7, 8 with at least one degree of rotational or translational freedom, wherein the wrist is connected to the end effector 9 and the second rotary arm 5 in order to place the end effector 9 at different angles or positions. In some embodiments, the wrist has three rotational arms 6, 7, and 8. In some embodiments, the axis of rotation of arm 6 is perpendicular to the axis of rotation of arm 7. In some embodiments, the axis of rotation of arm 7 is perpendicular to the axis of rotation of arm 8. In some embodiments, wrist 6, 7, or 8 is rotated in order to rotate dish 11.

In some embodiments, height arm 1 has three predetermined preferred height positions. In some embodiments, the fingers 10 and 11 enter a cabinet 14 to pick up, hold, or drop off a dish. In some embodiments, the axes of rotation of the first rotary arm 4 and the second rotary arm 5 are parallel to a window of the cabinet 14, wherein the window is a plane through which the robot enters and exits the cabinet 14. In some embodiments, end effector 9 grips the dish 12 in a region of dish 12 with lower amount of food material relative to other regions of the dish 12. In some embodiments, end effector 9 further comprises a vacuum suction cup to hold the dish with vacuum suction.

In some embodiments, end effector 9 holds dish 12 while dish 12 is being cleaned. In some embodiments, end effector 9 is cleaned after making contact with dish 12. In some embodiments, robot 13 further comprises a lateral translation arm to translate the first rotary arm along X or Y axes. In some embodiments, fingers 10 and 11 are substantially parallel to each other. In some embodiments, the angle between fingers 10 and 11 can be varied.

In some embodiments, one finger is larger than one or more other fingers and dish 12 rests on the larger finger such that the larger finger is under the dish 12. In some embodiments, a finger has at least one rotary joint to make the finger foldable. In some embodiments, the longest dimension of end effector 9 is substantially the same as the maximum distance of separation between the fingers 10, 11 and is substantially greater than the minimum distance of separation between the fingers 10, 11. In some embodiments, the longest dimension of end effector 9 is substantially smaller than the maximum distance of separation between the fingers 10, 11.

Figure 2:
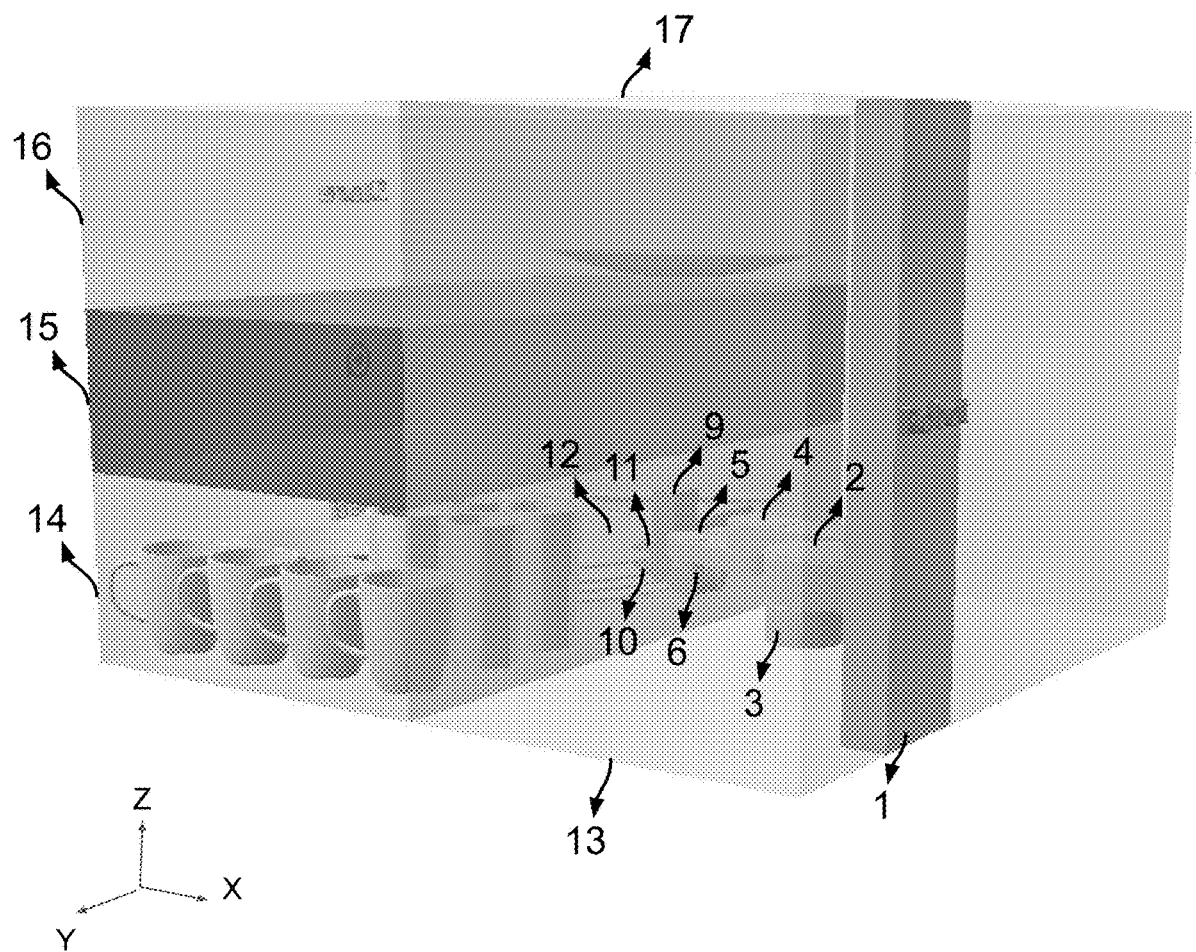
FIG. 2 shows another three-dimensional view of a dish handling robot picking up a stacked plate from a cabinet, in accordance with the invention.

FIG. 2 shows another three-dimensional view of a dish handling robot 13 picking up a stacked plate 12 from a cabinet 14, in accordance with the invention.

Figure 3:
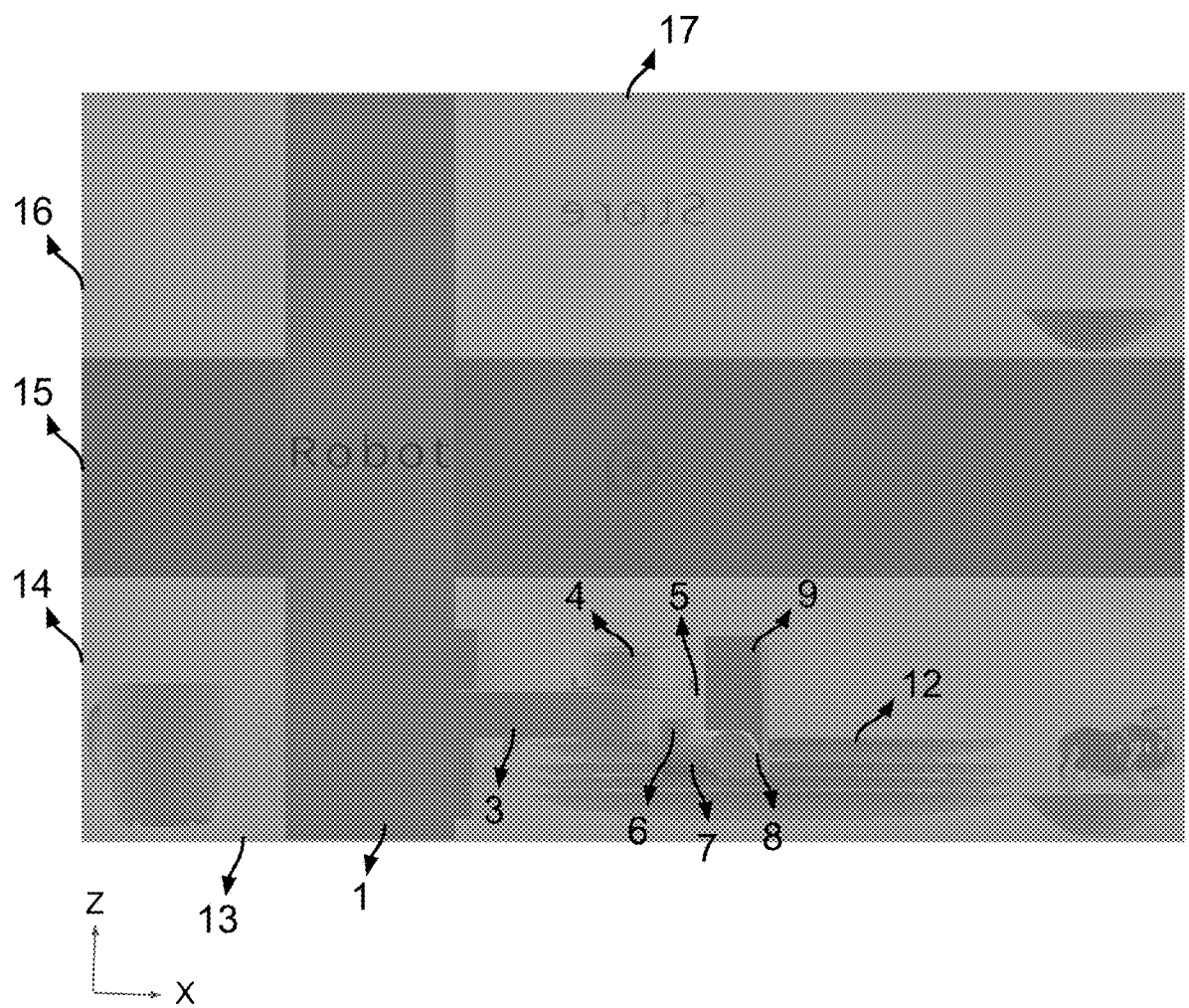
FIG. 3 shows a back view of a dish handling robot picking up a stacked plate from a cabinet, in accordance with the invention.

FIG. 3 shows a back view of a dish handling robot 13 picking up a stacked plate 12 from a cabinet 14, in accordance with the invention.

Figure 4:
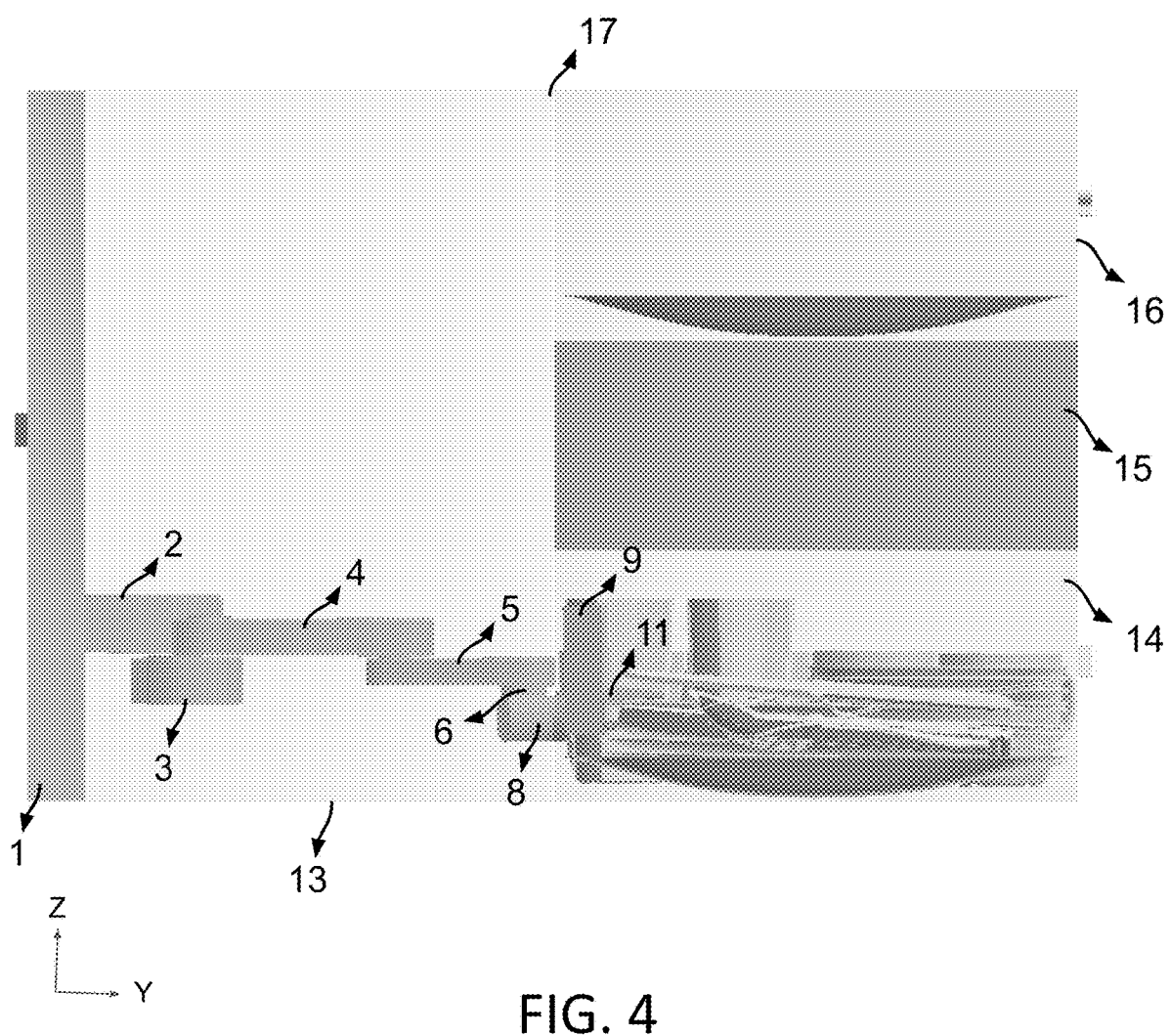
FIG. 4 shows a left-side view of a dish handling robot picking up a stacked plate from a cabinet, in accordance with the invention.

FIG. 4 shows a left-side view of a dish handling robot 13 picking up a stacked plate 12 from a cabinet 14, in accordance with the invention.

Figure 5:
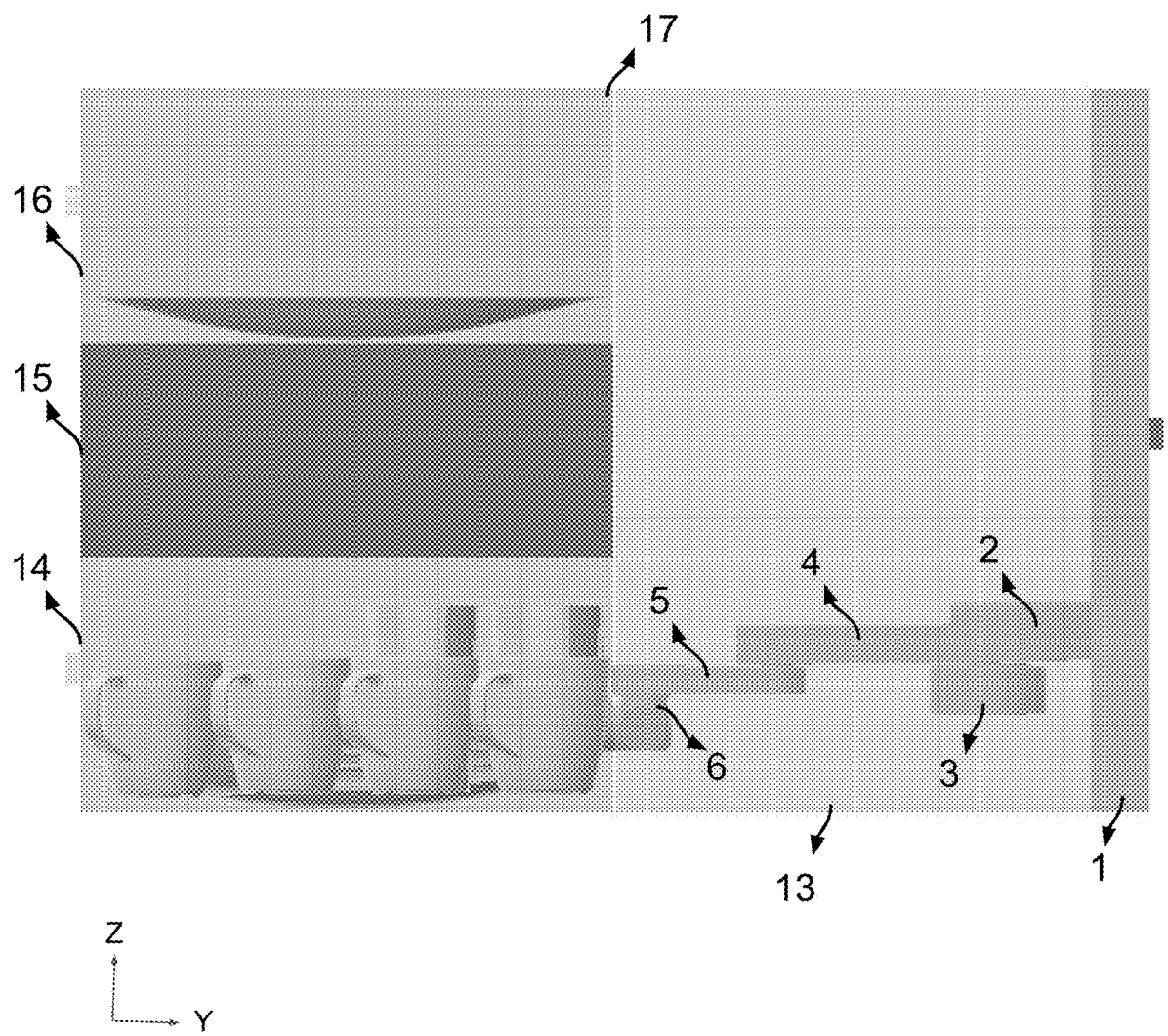
FIG. 5 shows a right-side view of a dish handling robot picking up a stacked plate from a cabinet, in accordance with the invention.

FIG. 5 shows a right-side view of a dish handling robot 13 picking up a stacked plate 12 from a cabinet 14, in accordance with the invention.

Figure 6:
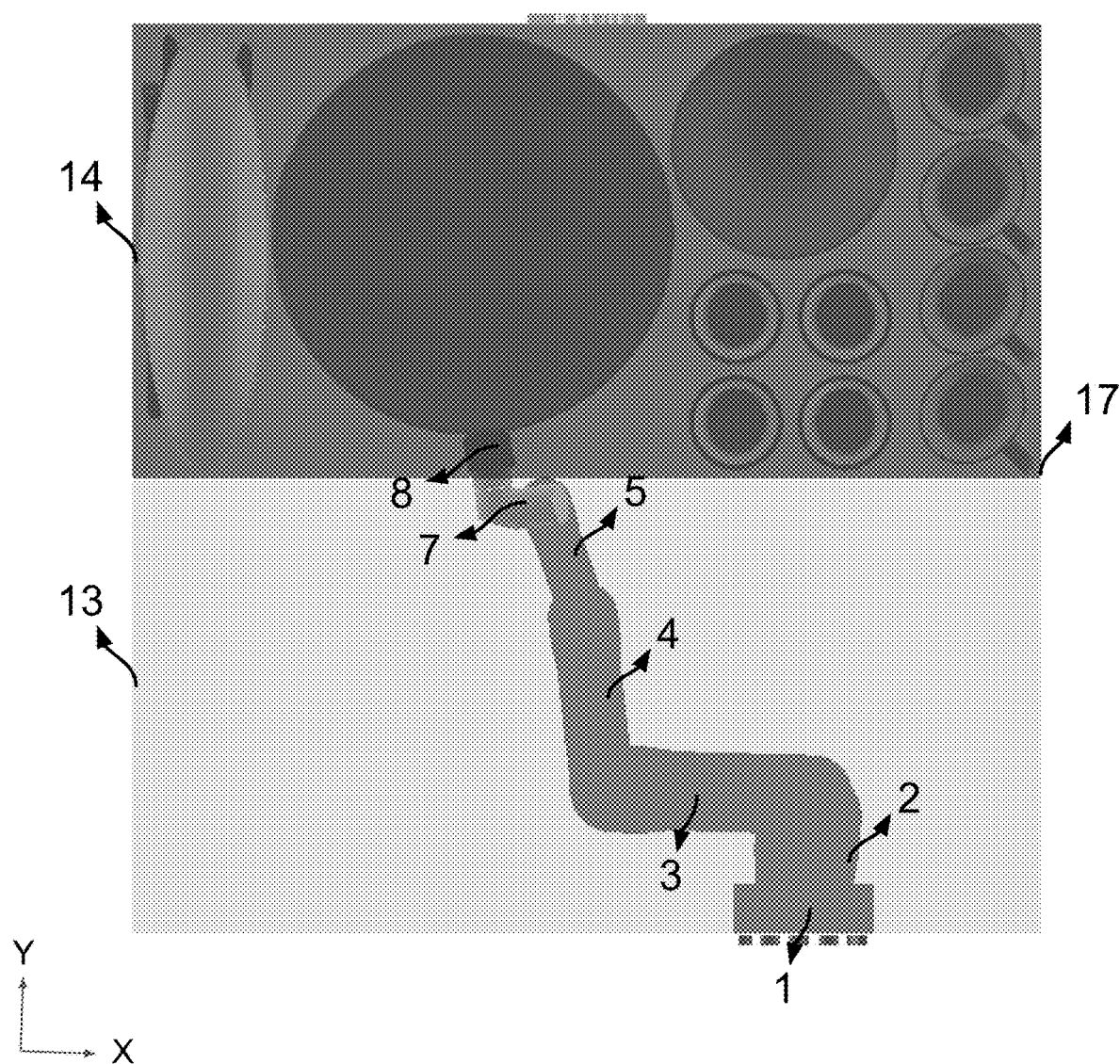
FIG. 6 shows a bottom view of a dish handling robot picking up a stacked plate from a cabinet, in accordance with the invention.

FIG. 6 shows a bottom view of a dish handling robot 13 picking up a stacked plate 12 from a cabinet 14, in accordance with the invention.

Figure 7:
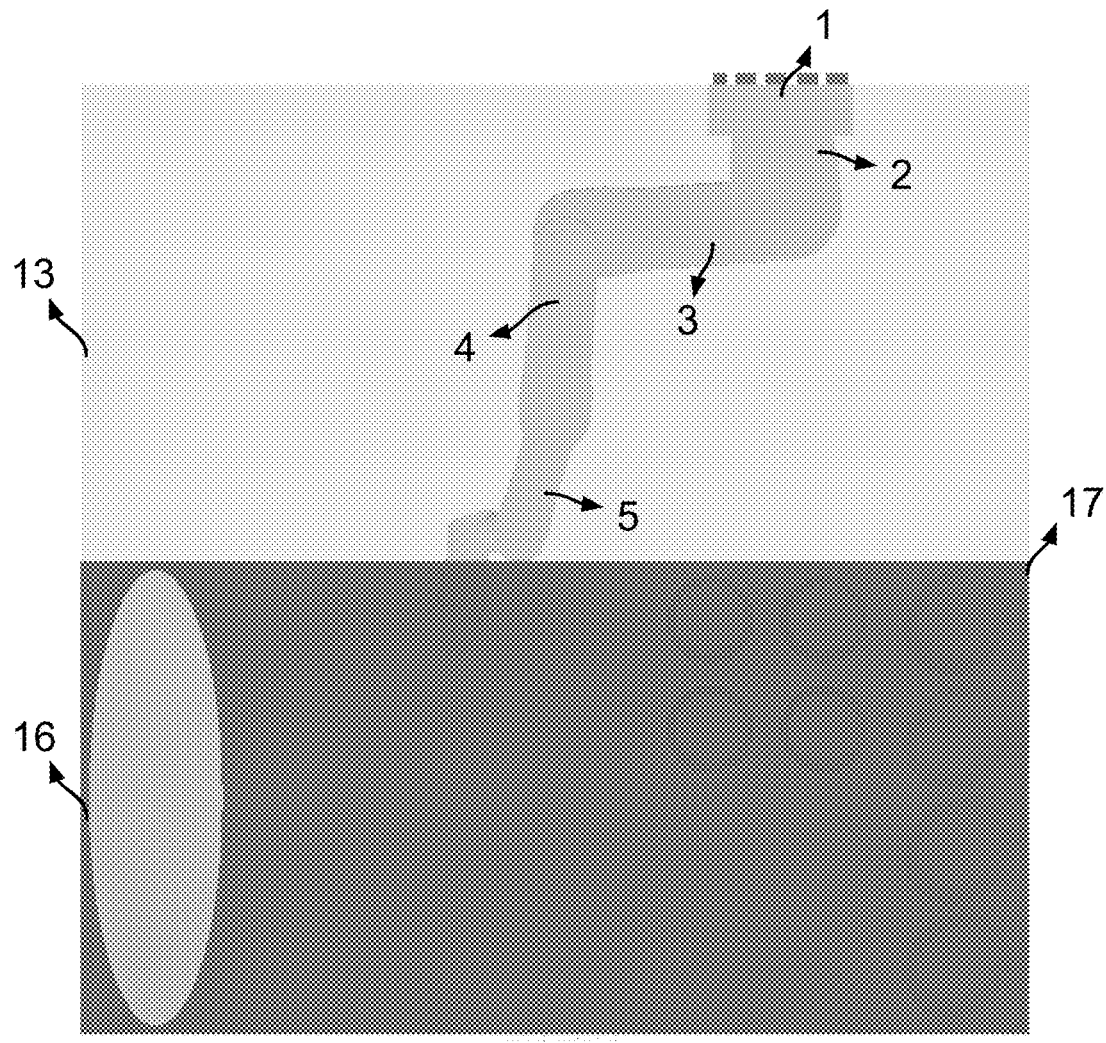
FIG. 7 shows a top view of a dish handling robot picking up a stacked plate from a cabinet, in accordance with the invention.

FIG. 7 shows a top view of a dish handling robot 13 picking up a stacked plate 12 from a cabinet 14, in accordance with the invention.

Figure 8:
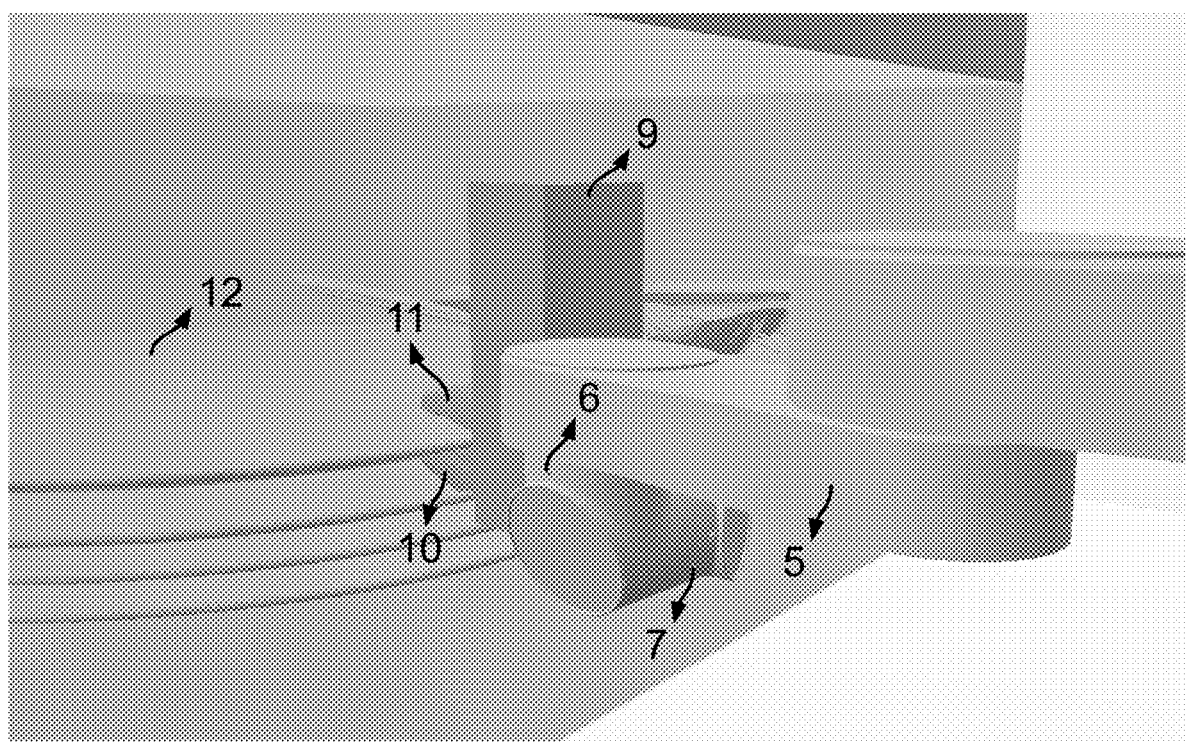
FIG. 8 shows a three dimensional close up view of a dish handling robot picking up a stacked plate from a cabinet, in accordance with the invention.

FIG. 8 shows a three dimensional close up view of a dish handling robot 13 picking up a stacked plate 12 from a cabinet 14, in accordance with the invention.

Figure 9:
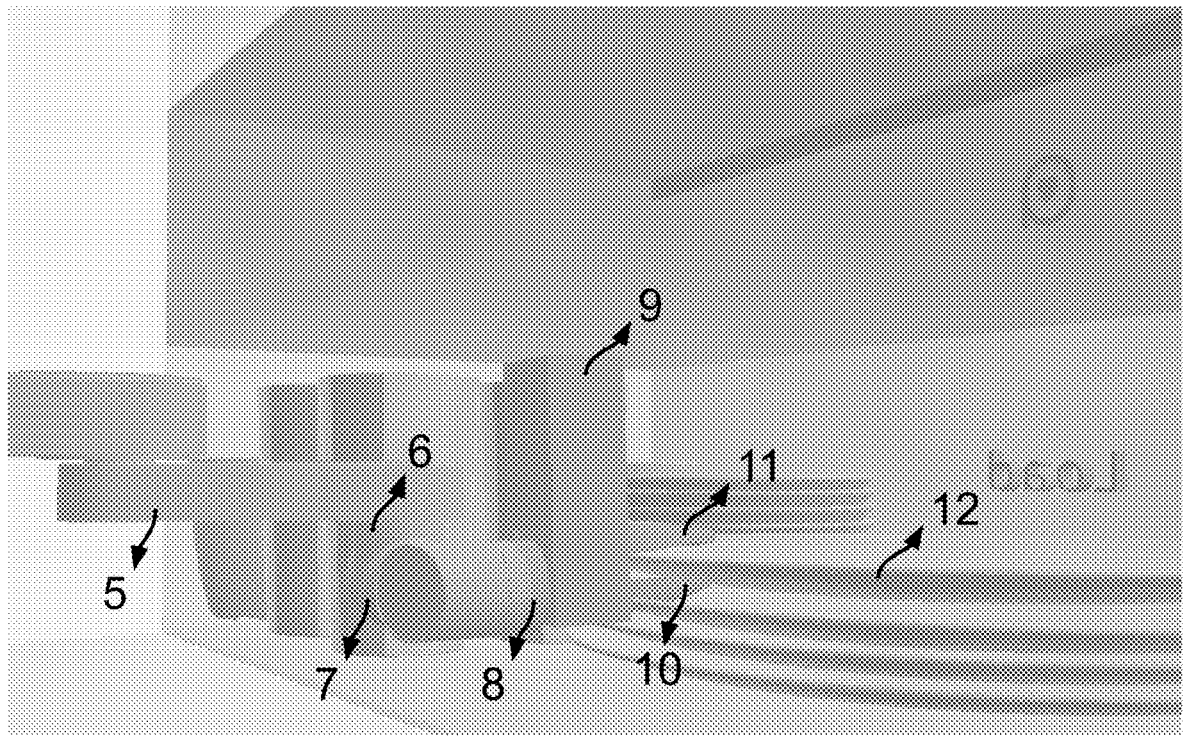
FIG. 9 shows another three dimensional close up view of a dish handling robot picking up a stacked plate from a cabinet, in accordance with the invention.

FIG. 9 shows another three dimensional close up view of a dish handling robot 13 picking up a stacked plate 12 from a cabinet 14, in accordance with the invention.

Figure 10:
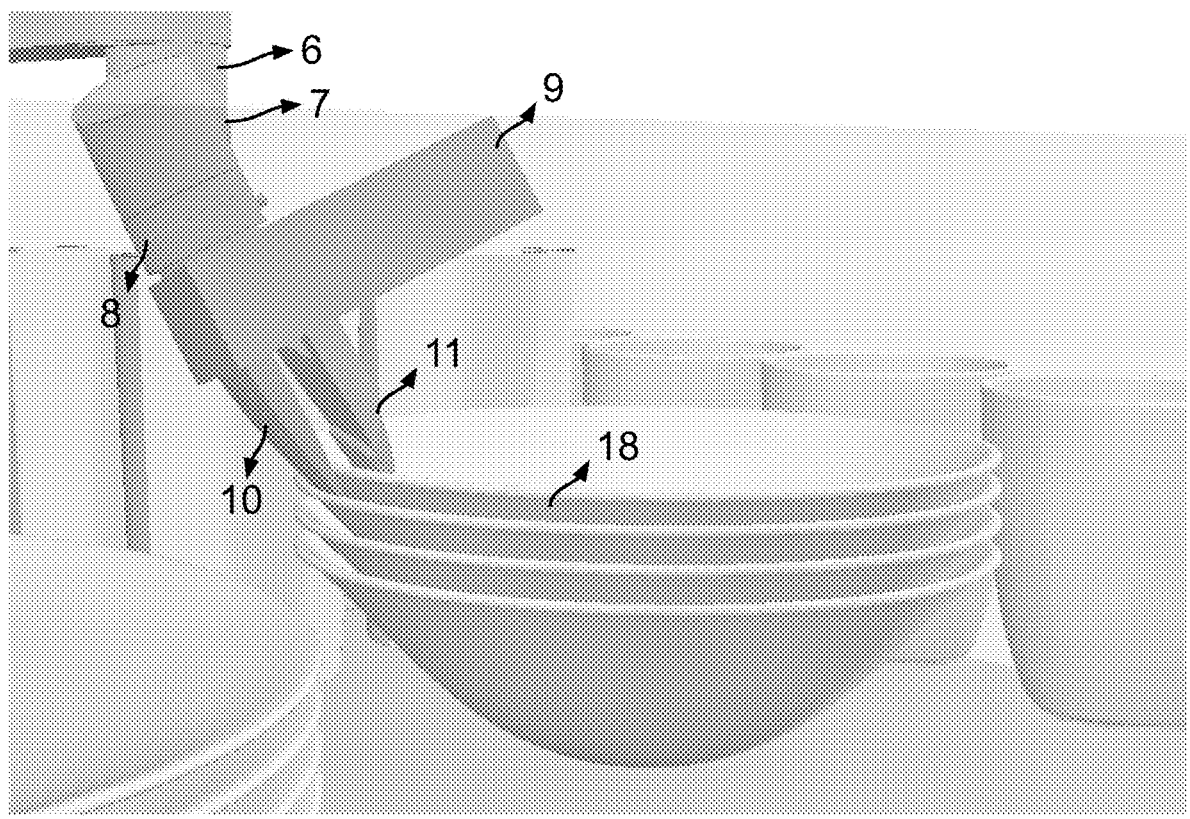
FIG. 10 shows a three dimensional close up view of a dish handling robot picking up a stacked bowl from a cabinet, in accordance with the invention.

FIG. 10 shows a three dimensional close up view of a dish handling robot 13 picking up a stacked bowl from a cabinet, in accordance with the invention.

Figure 11:
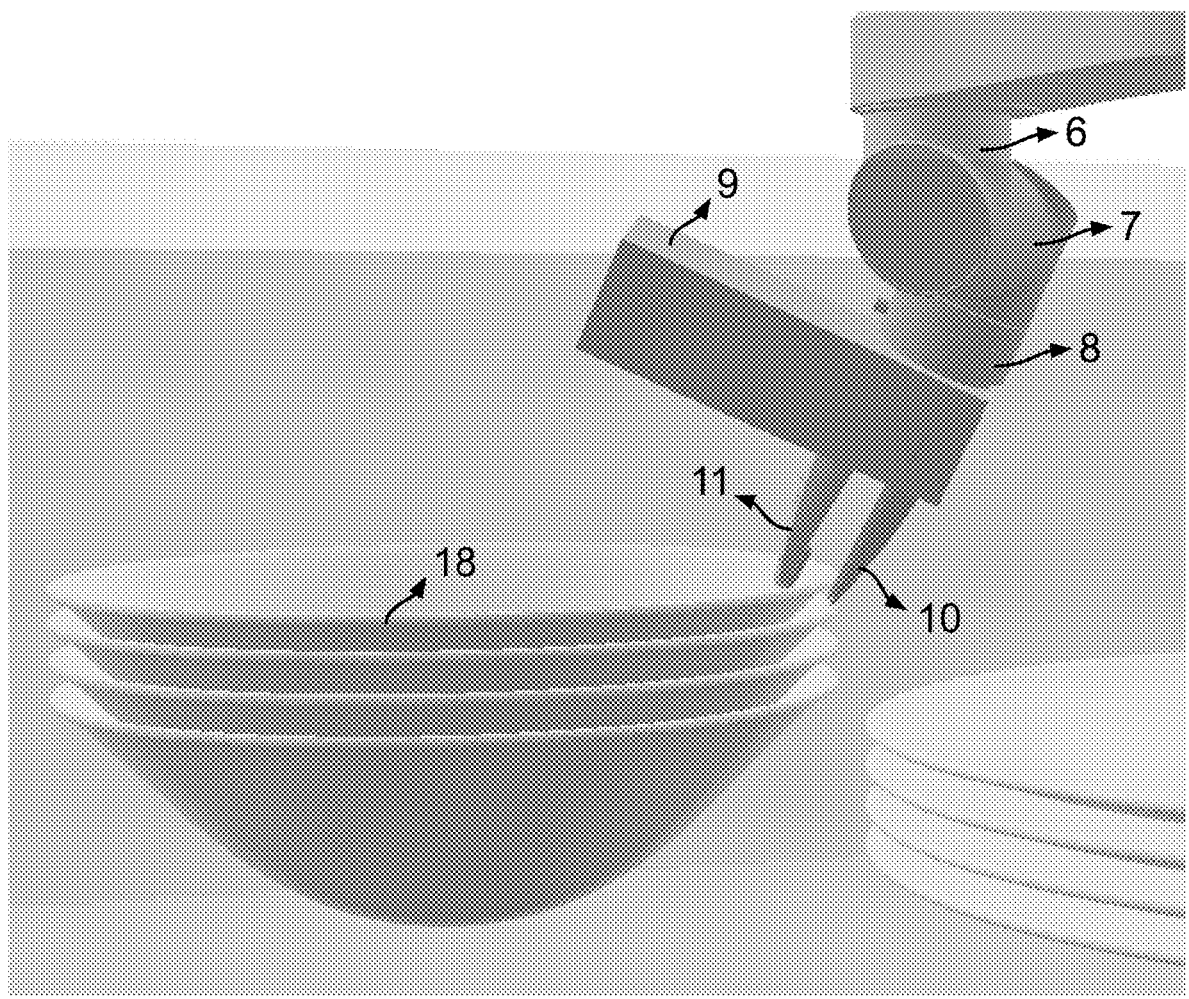
FIG. 11 shows another three dimensional close up view of a dish handling robot picking up a stacked bowl from a cabinet, in accordance with the invention.

FIG. 11 shows another three dimensional close up view of a dish handling robot 13 picking up a stacked bowl from a cabinet, in accordance with the invention.

Figure 12:
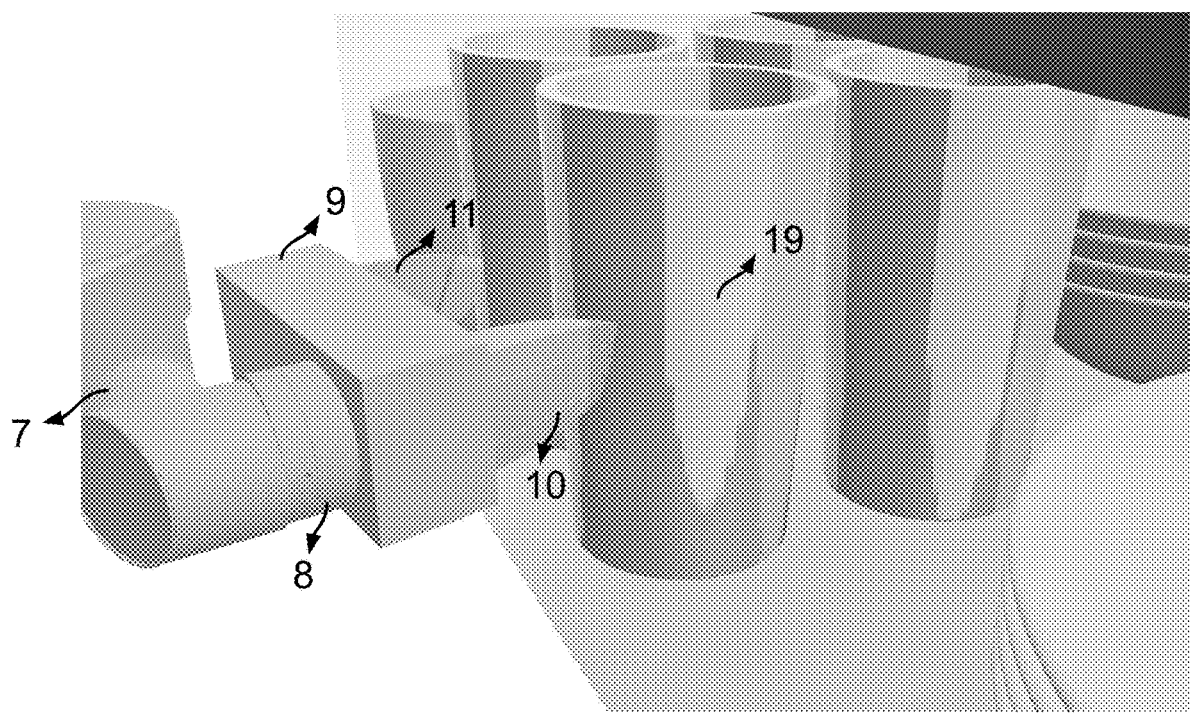
FIG. 12 shows a three dimensional close up view of a dish handling robot picking up a cup from a cabinet, in accordance with the invention.

FIG. 12 shows a three dimensional close up view of a dish handling robot 13 picking up a cup from a cabinet, in accordance with the invention.

Figure 13:
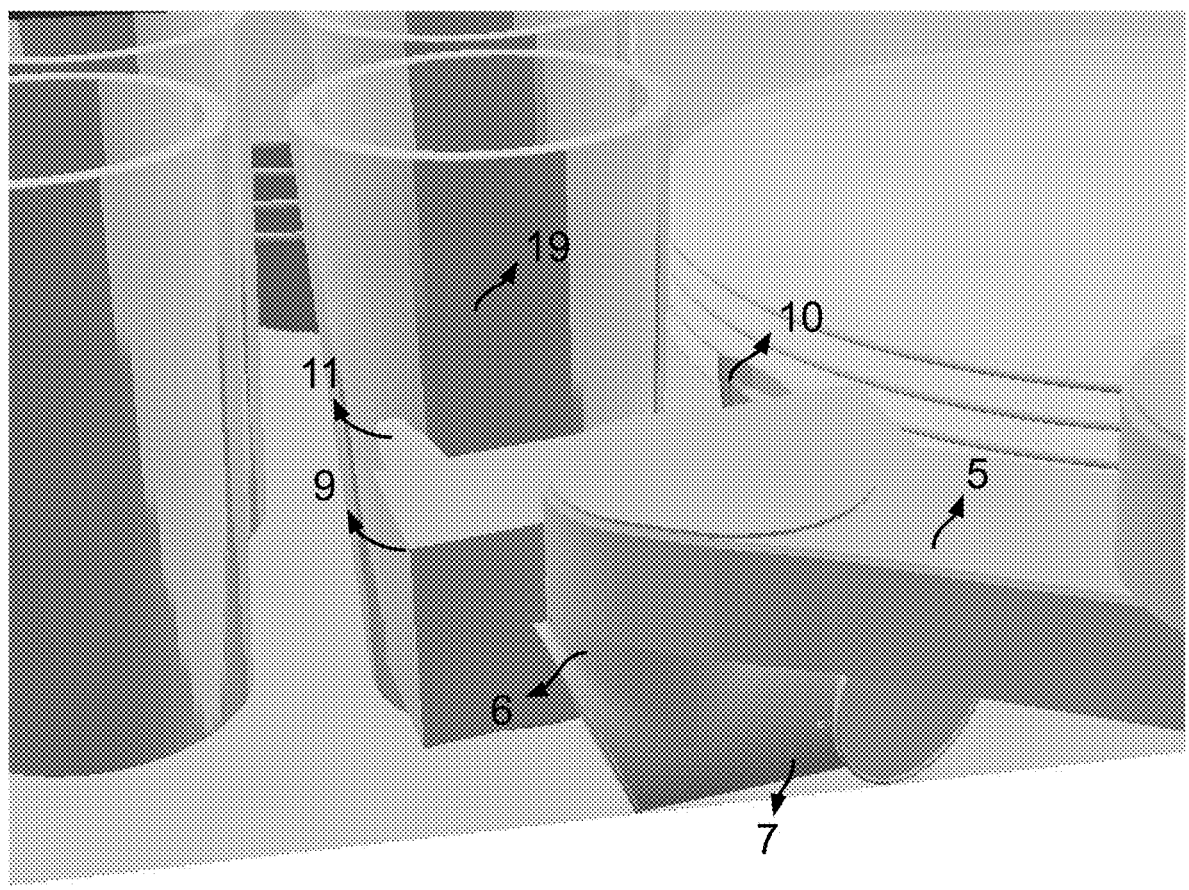
FIG. 13 shows another three dimensional close up view of a dish handling robot picking up a cup from a cabinet, in accordance with the invention.

FIG. 13 shows another three dimensional close up view of a dish handling robot 13 picking up a cup from a cabinet, in accordance with the invention.

Figure 14:
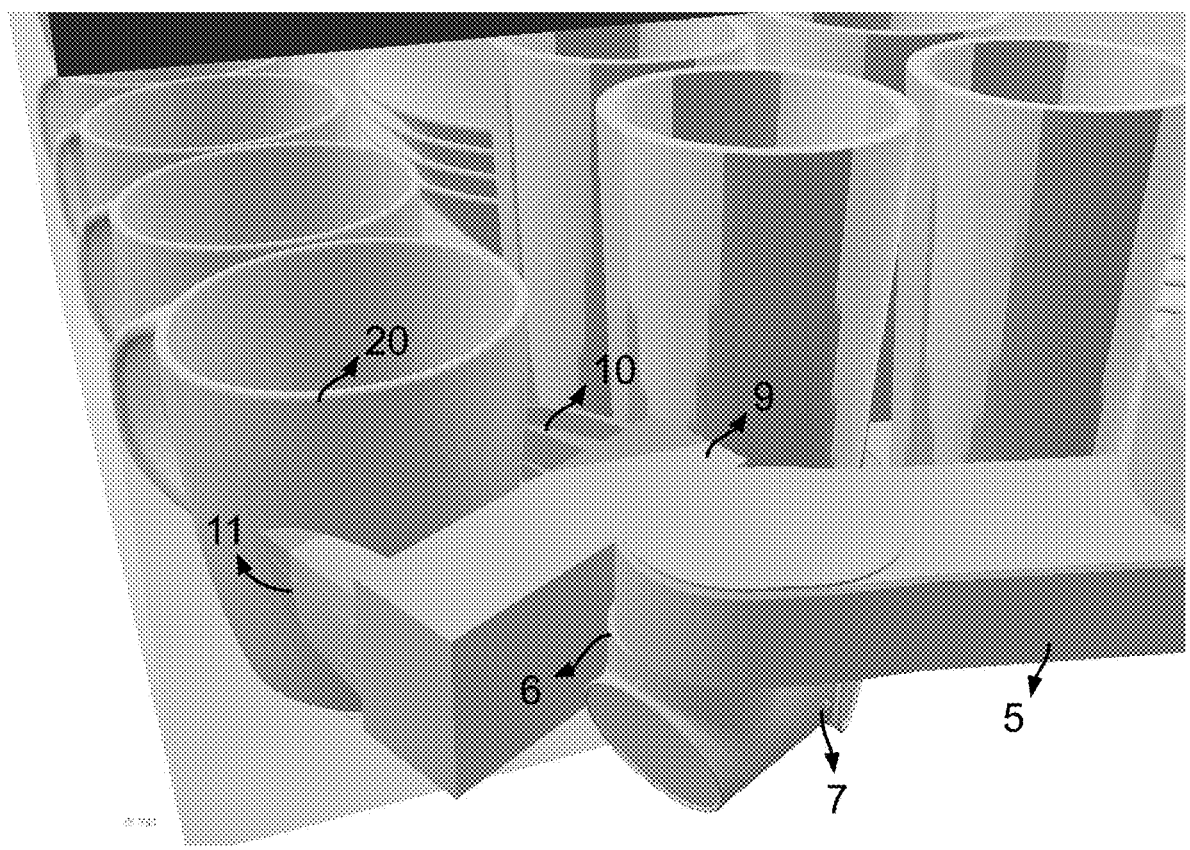
FIG. 14 shows a three dimensional close up view of a dish handling robot picking up a mug from a cabinet, in accordance with the invention.

FIG. 14 shows a three dimensional close up view of a dish handling robot 13 picking up a mug 20 from a cabinet, in accordance with the invention.

Figure 15:
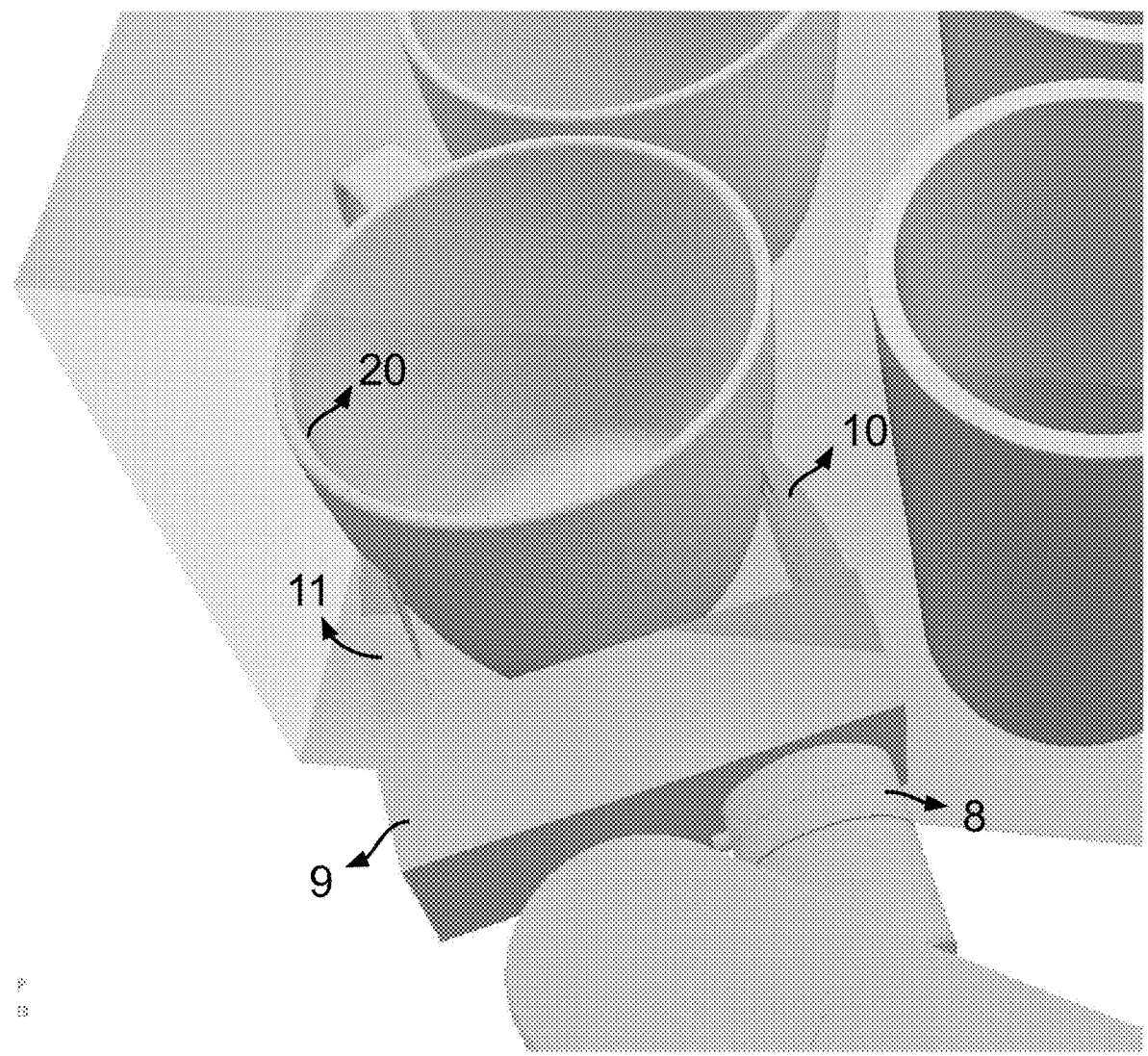
FIG. 15 shows another three dimensional close up view of a dish handling robot picking up a mug from a cabinet, in accordance with the invention.

FIG. 15 shows another three dimensional close up view of a dish handling robot 13 picking up a mug 20 from a cabinet, in accordance with the invention.

Figure 16:
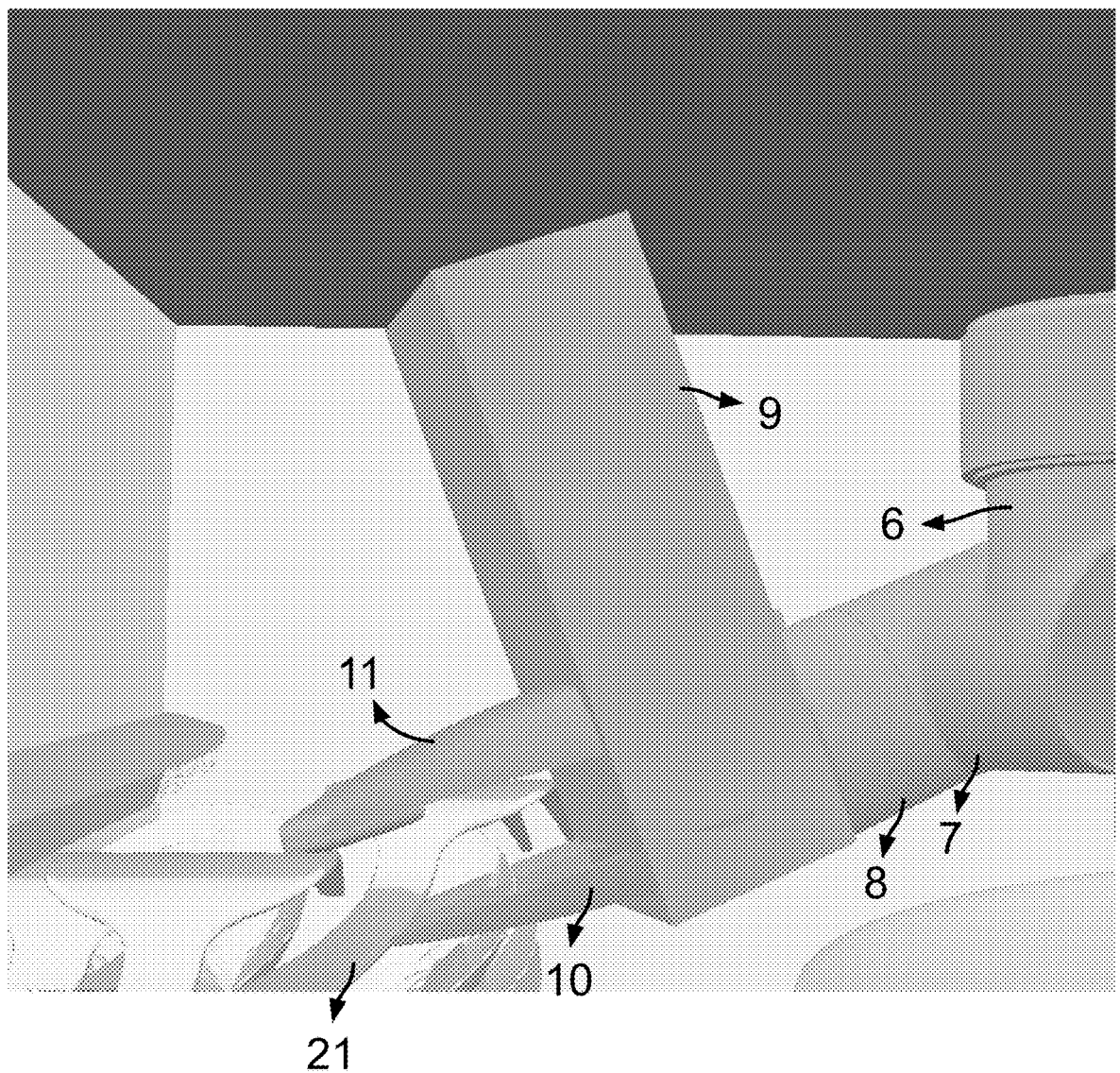
FIG. 16 shows a three dimensional close up view of a dish handling robot picking up a fork from a cabinet, in accordance with the invention.

FIG. 16 shows a three dimensional close up view of a dish handling robot 13 picking up a fork 21 from a cabinet, in accordance with the invention.

Figure 17:
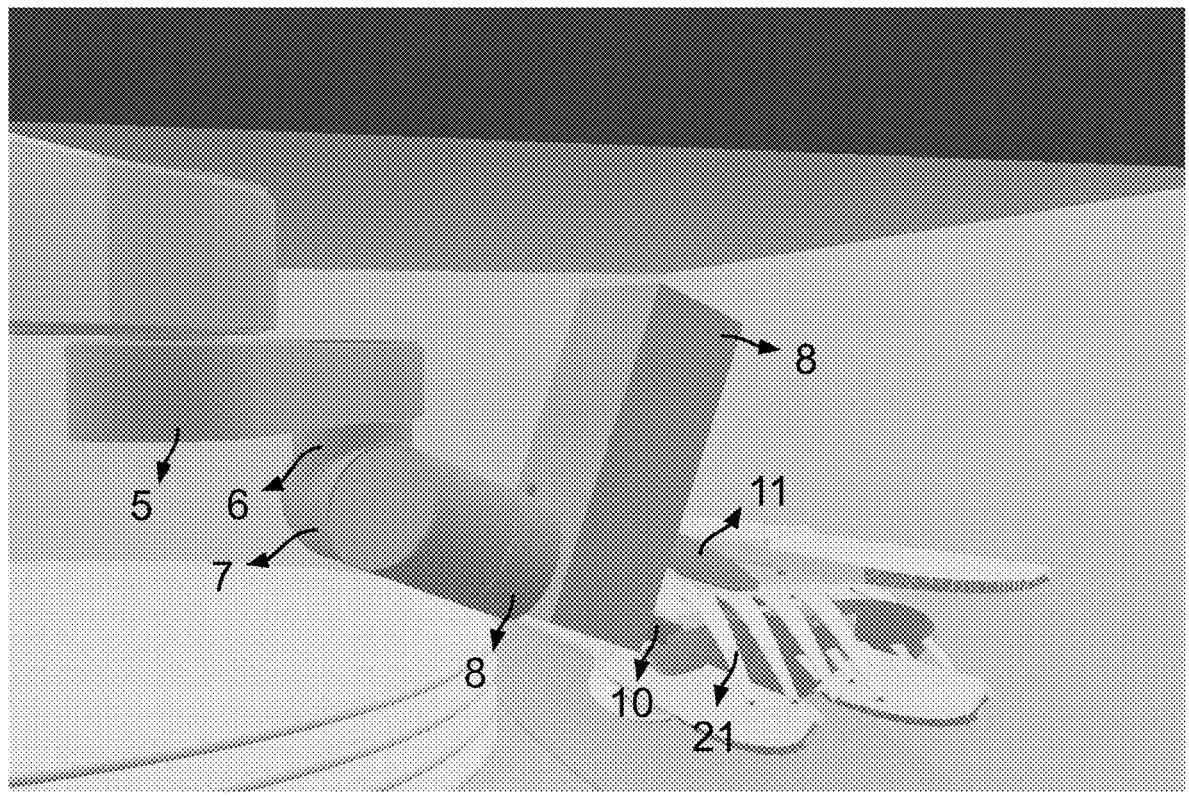
FIG. 17 shows another three dimensional close up view of a dish handling robot picking up a fork from a cabinet, in accordance with the invention.

FIG. 17 shows another three dimensional close up view of a dish handling robot 13 picking up a fork 21 from a cabinet, in accordance with the invention.

Figure 18:
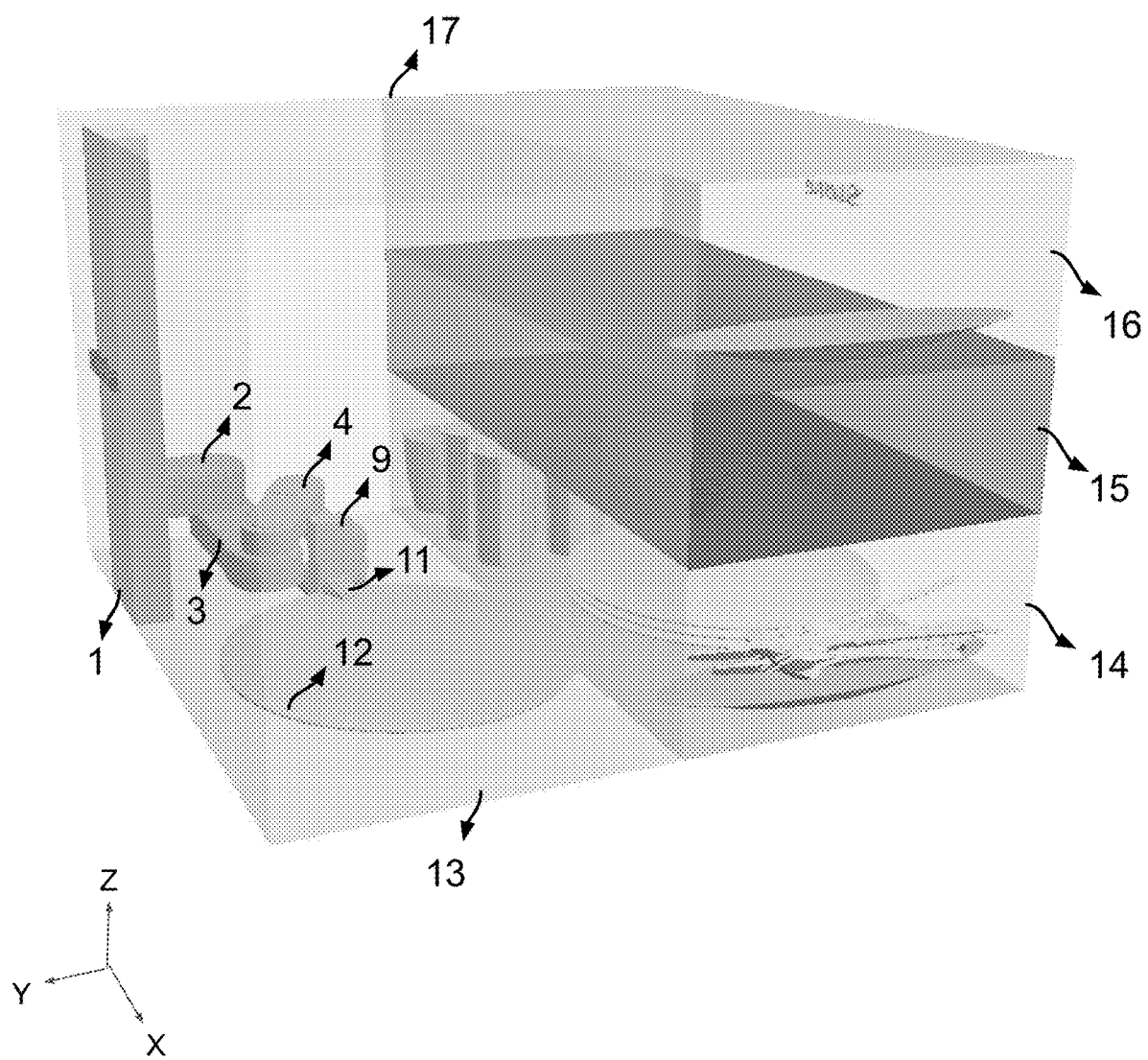
FIG. 18 shows a three dimensional view of a dish handling robot picking up and holding a plate from a cabinet, in accordance with the invention.

FIG. 18 shows a three dimensional view of a dish handling robot 13 picking up and holding a plate 12 from a cabinet, in accordance with the invention.

Figure 19:
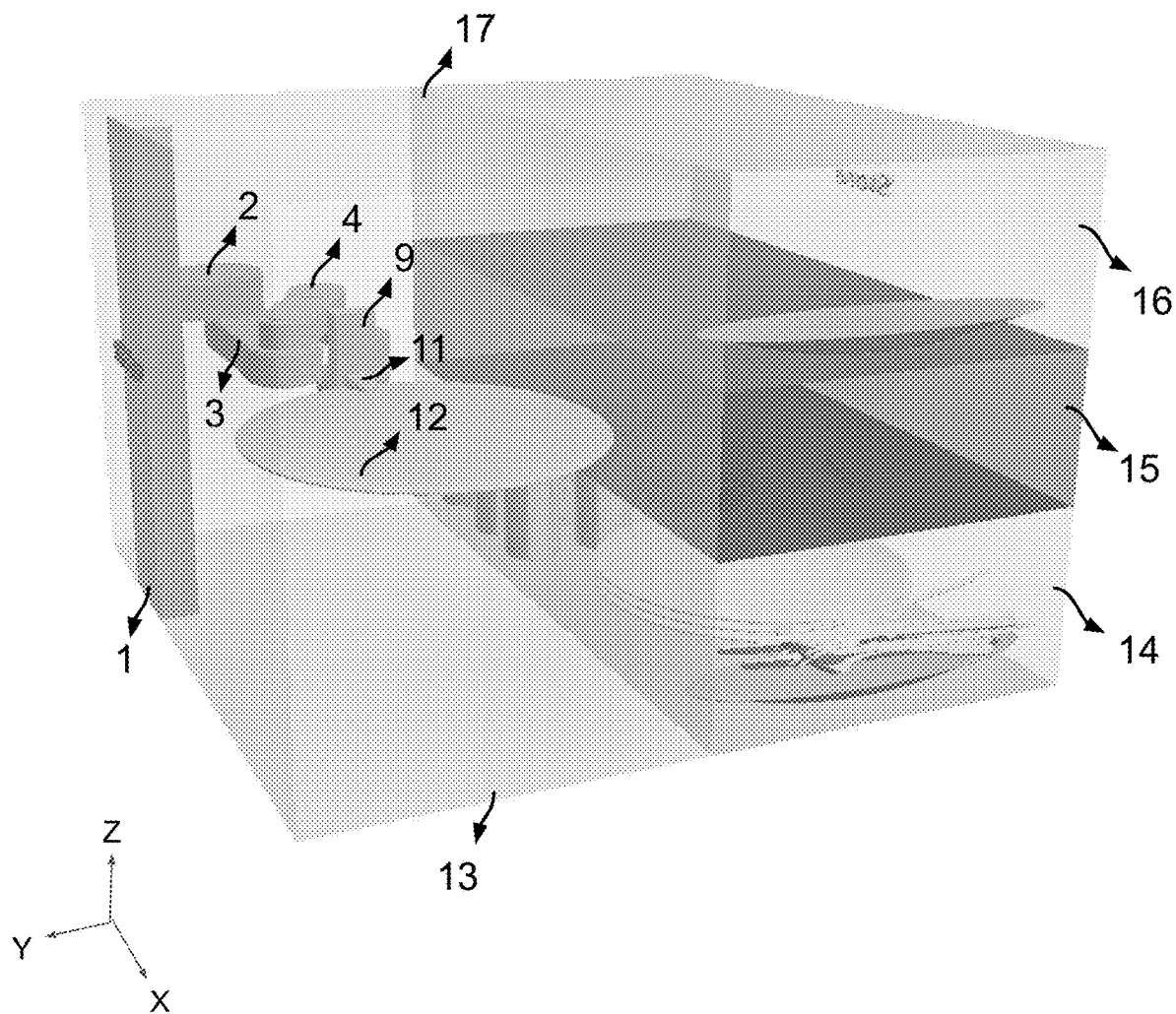
FIG. 19 shows a three dimensional view of a dish handling robot picking up, holding, and raising a plate from a cabinet, in accordance with the invention.

FIG. 19 shows a three dimensional view of a dish handling robot 13 picking up, holding, and raising a plate 12 from a cabinet, in accordance with the invention.

Figure 20:
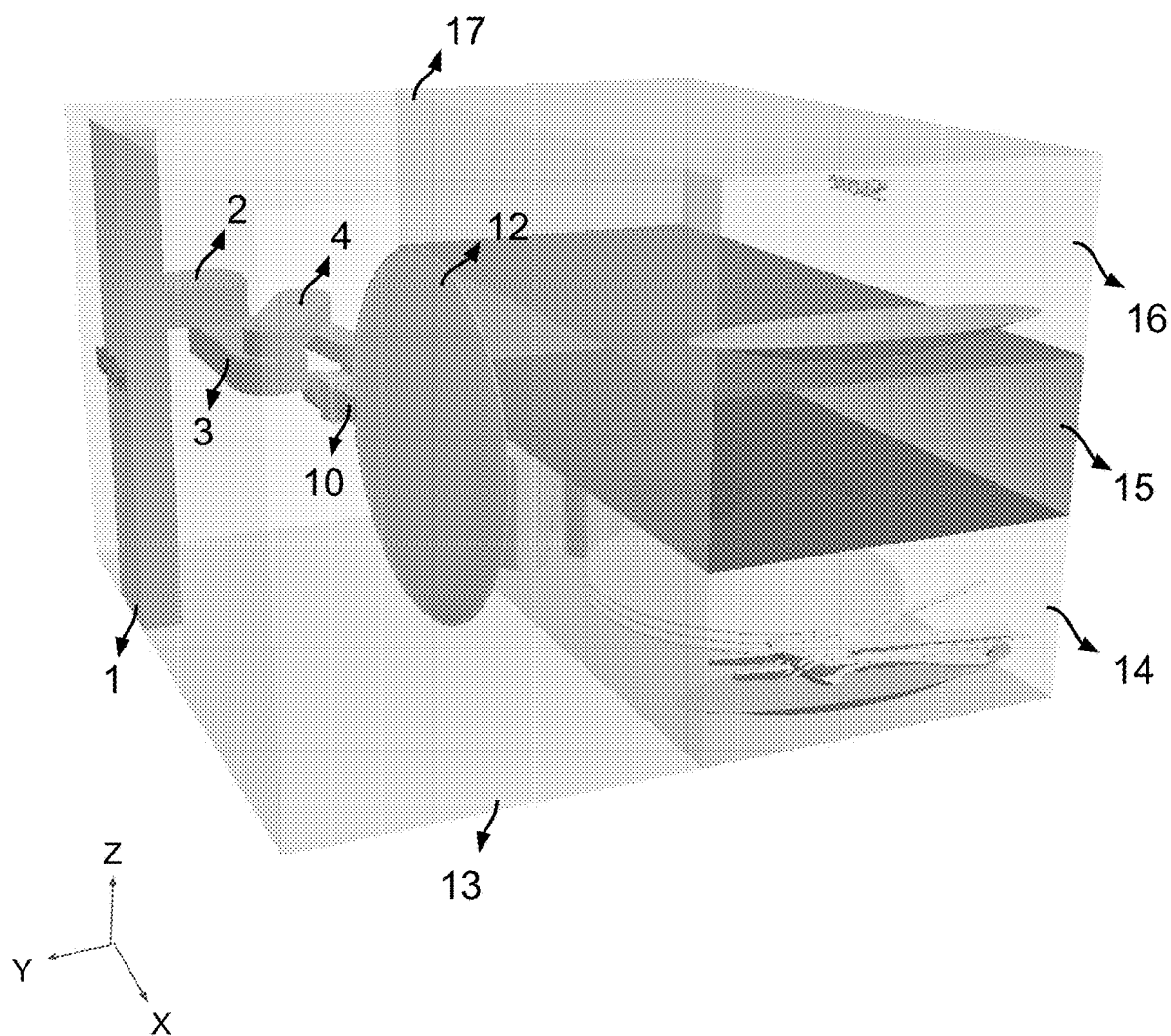
FIG. 20 shows a three dimensional view of a dish handling robot picking up, holding, raising, and rotating a plate by 90 degrees about X axis, in accordance with the invention.

FIG. 20 shows a three dimensional view of a dish handling robot 13 picking up, holding, raising, and rotating a plate 12 by 90 degrees about X axis, in accordance with the invention.

Figure 21:
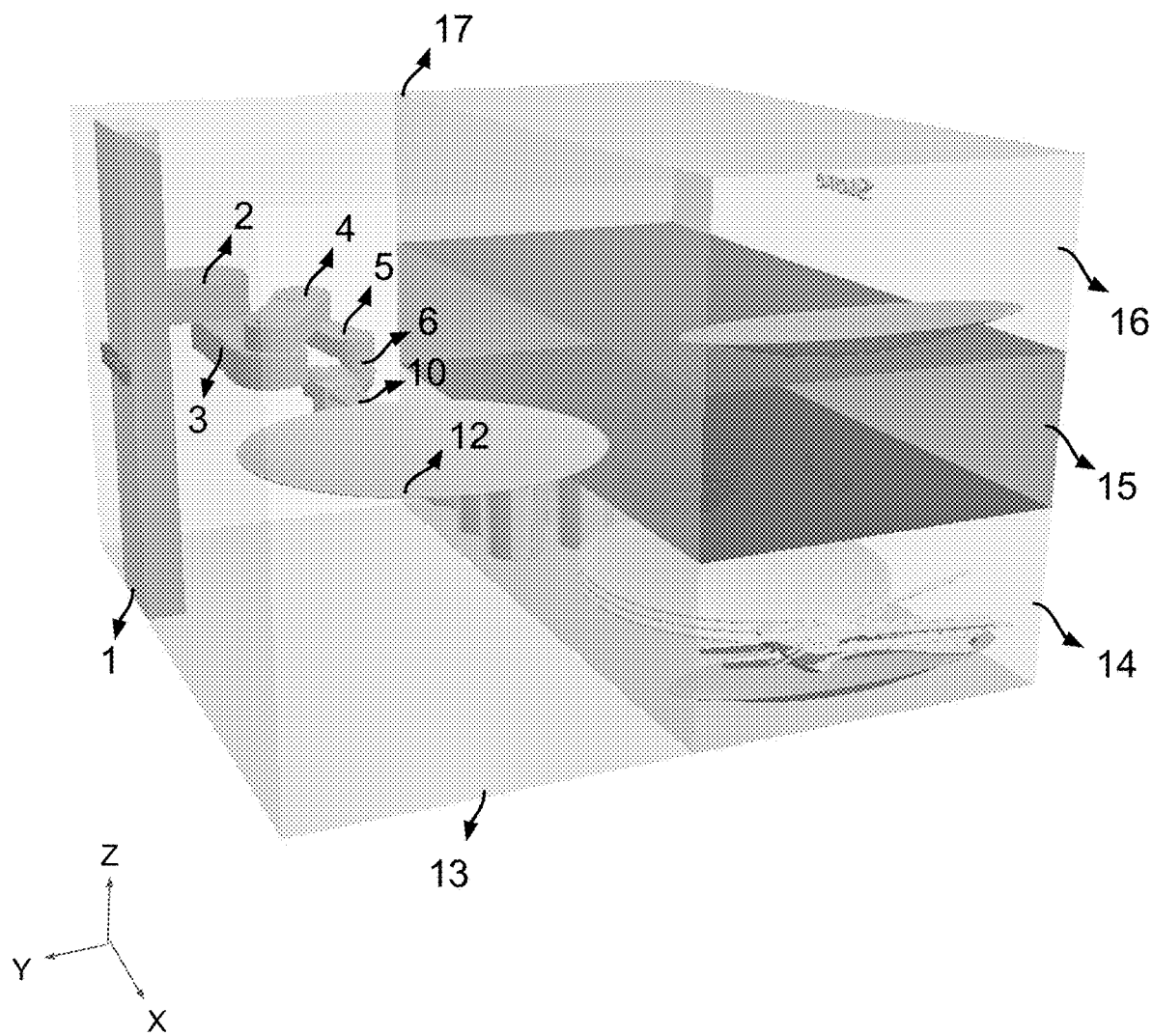
FIG. 21 shows a three dimensional view of a dish handling robot picking up, holding, raising, and rotating a plate by 180 degrees about X axis, in accordance with the invention.

FIG. 21 shows a three dimensional view of a dish handling robot 13 picking up, holding, raising, and rotating a plate 12 by 180 degrees about X axis, in accordance with the invention.

Figure 22:
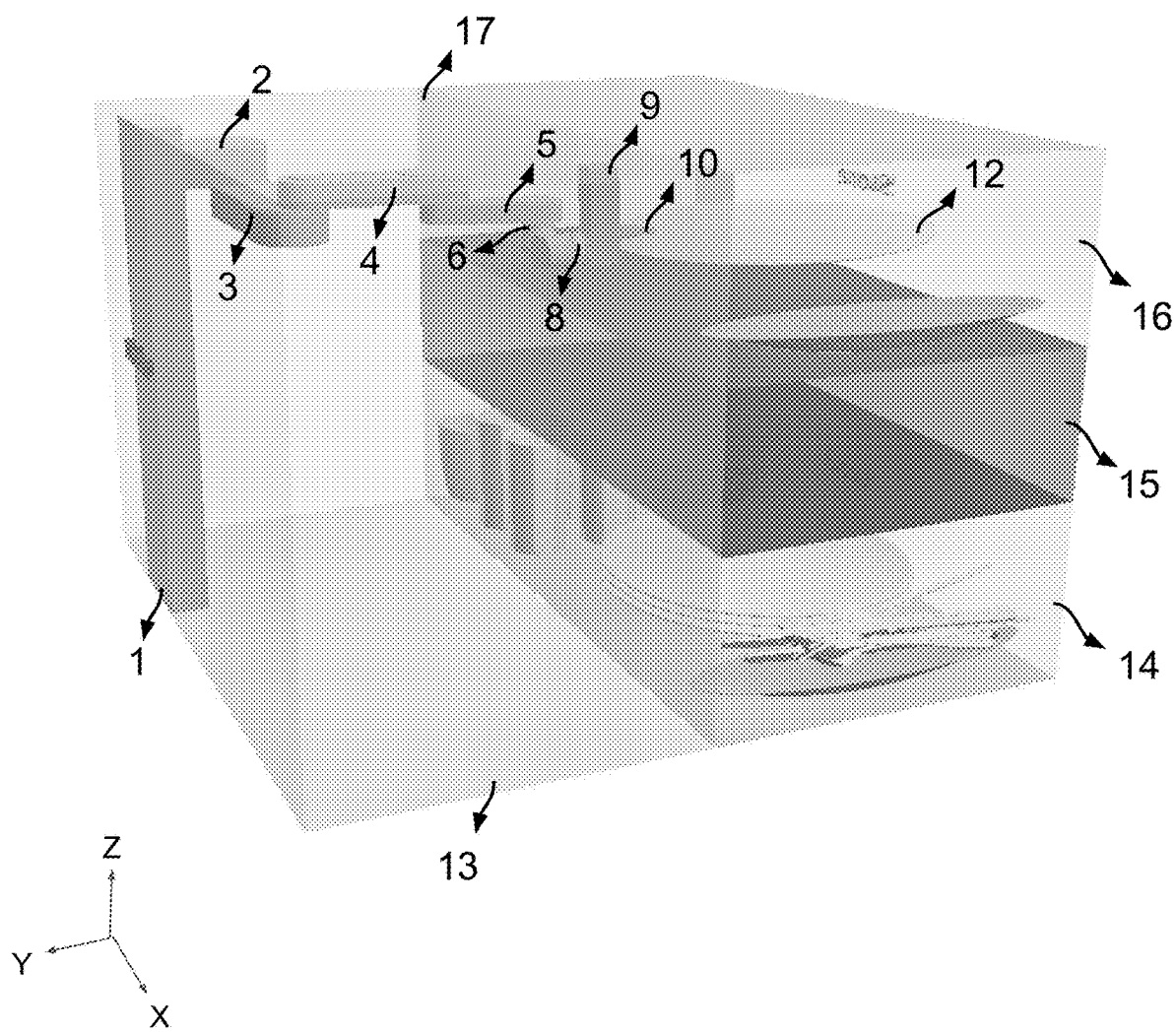
FIG. 22 shows a three dimensional view of a dish handling robot dropping off a plate in a cabinet, in accordance with the invention.

FIG. 22 shows a three dimensional view of a dish handling robot 13 dropping off a plate 12 in a cabinet, in accordance with the invention.

Figure 23:
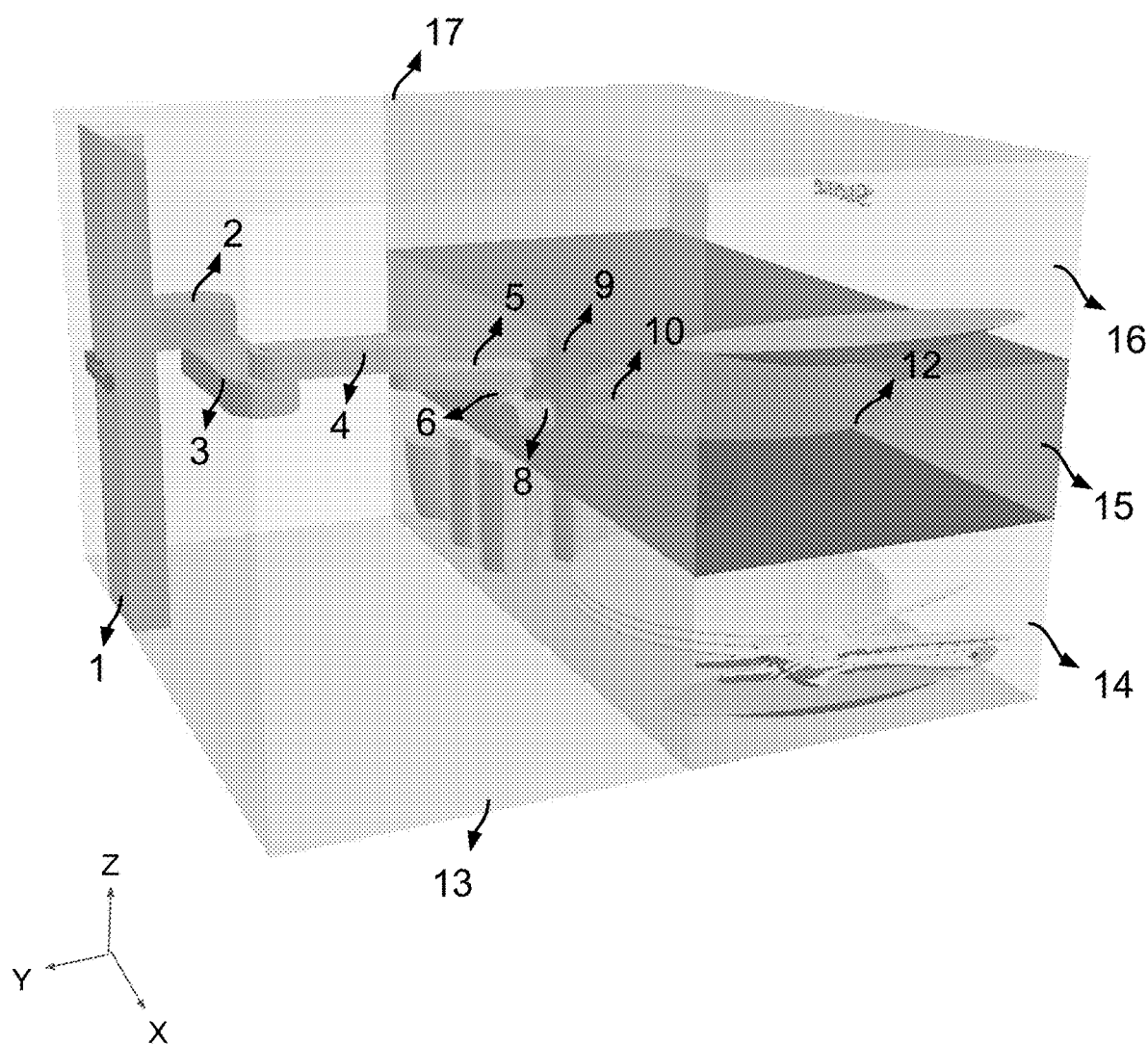
FIG. 23 shows a three dimensional view of a dish handling robot dropping off a plate in another cabinet, in accordance with the invention.

FIG. 23 shows a three dimensional view of a dish handling robot 13 dropping off a plate 12 in another cabinet, in accordance with the invention.

Figure 24:
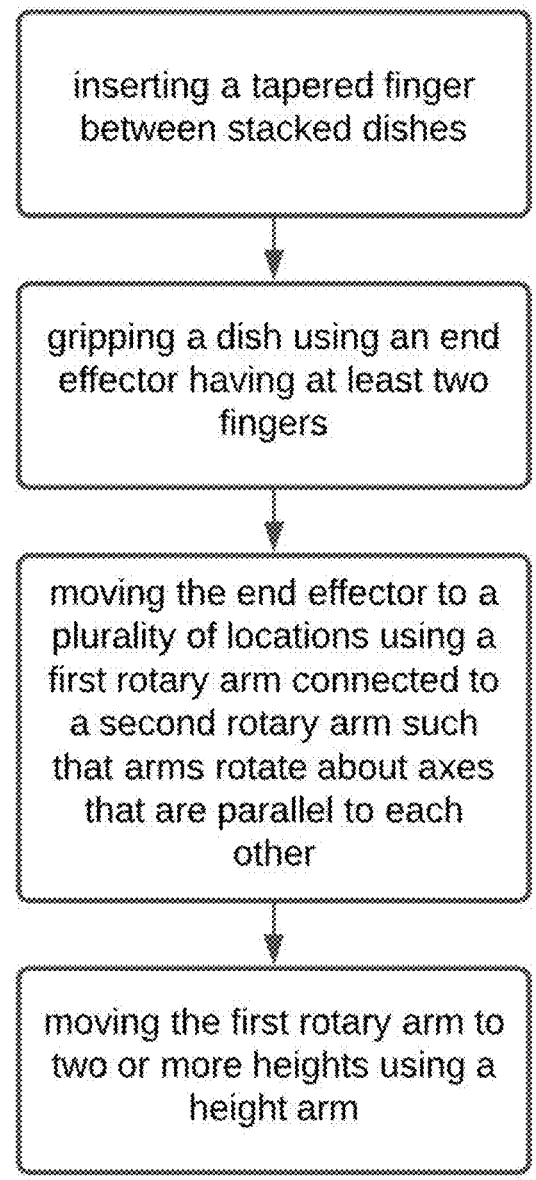
FIG. 24 shows a method for handling a dish, in accordance with the invention.

FIG. 24 shows a method for handling a dish, in accordance with the invention. In some embodiments, the method comprises a sequence of steps to pick up, hold and drop off the dish. The first step involves inserting a tapered finger between the dish which is stacked together with another dish. The second step involves gripping the dish using an end effector having at least two fingers, wherein the distance of separation between the two fingers is configurable. The third step involves moving the end effector to a plurality of locations using a first rotary arm connected to a second rotary arm, wherein the second rotary arm is connected to the end effector, and the first and second rotary arms rotate about axes that are parallel to each other. The fourth step involves moving the first rotary arm to two or more heights using a height arm connected to the first rotary arm.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described above, may be implemented as software code to be executed by a processor using any suitable computer language such as, for example, Python, Java, C++ or Perl using, for example, conventional or object-oriented techniques. The software code may be stored as a series of instructions, or commands on a computer readable medium, such as a random access memory (RAM), a read only memory (ROM), a storage device such as a solid state drive (SSD) or a hard drive. Any such computer readable medium may reside on or within a single computational apparatus, and may be present on or within different computational apparatuses within a system or network.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A robot for handling a dish, comprising:
   a. a tapered finger for picking up said dish which is stacked together with another dish, wherein said tapered finger is inserted between said dish and said another dish;
   b. an end effector having at least two fingers, wherein the distance of separation between said two fingers is configured to grip said dish;
   c. a first rotary arm connected to a second rotary arm, wherein said second rotary arm is connected to said end effector, and said first rotary arm and said second rotary arm rotate about axes that are parallel to each other in order to move said end effector to a plurality of locations;
   d. a height arm connected to said first rotary arm, wherein said height arm can be configured to position said first rotary arm at two or more heights,
   whereby said robot can pick up, hold, and drop off said dish.

2. The robot of claim 1, further comprising a wrist with at least one degree of rotational or translational freedom, wherein said wrist is connected to said end effector and said second rotary arm in order to place said end effector at different angles or positions.

3. The robot of claim 2, wherein said wrist is rotated in order to rotate said dish.

4. The robot of claim 1, wherein said height arm has three predetermined preferred height positions.

5. The robot of claim 1, wherein said fingers enter a cabinet to pick up, hold, or drop off a dish.

6. The robot of claim 5, wherein said axes of rotation of said first rotary arm and said second rotary arm are parallel to a window of said cabinet, wherein said window is a plane through which said robot enters and exits said cabinet.

7. The robot of claim 1, wherein said end effector grips said dish in a region of dish with lower amount of food material relative to other regions of said dish.

8. The robot of claim 1, wherein said end effector further comprises a vacuum suction cup to hold said dish with vacuum suction.

9. The robot of claim 1, wherein said dish is an article that makes contact with a food or a drink while preparing, serving, consuming, or storing of the food or the drink.

10. The robot of claim 1, wherein said dish is a plate, bowl, cup, mug, fork, spoon, knife, or a chopstick.

11. The robot of claim 1, wherein said end effector holds said dish while the dish is being cleaned.

12. The robot of claim 1, wherein said end effector is cleaned after making contact with said dish.

13. The robot of claim 1, further comprising a lateral translation arm to translate said first rotary arm along X or Y axes.

14. The robot of claim 1, wherein said fingers are substantially parallel to each other.

15. The robot of claim 1, wherein the angle between said fingers can be varied.

16. The robot of claim 1, wherein one finger is larger than one or more other fingers and said dish rests on the larger finger such that the larger finger is under said dish.

17. The robot of claim 1, wherein a finger has at least one rotary joint to make the finger foldable.

18. The robot of claim 1, wherein said longest dimension of end effector is substantially the same as the maximum distance of separation between said fingers and is substantially greater than the minimum distance of separation between said fingers.

19. The robot of claim 1, wherein said longest dimension of end effector is substantially smaller than the maximum distance of separation between said fingers.

20. A method for handling a dish, comprising:
 a. inserting a tapered finger between said dish which is stacked together with another dish;
 b. gripping said dish using an end effector having at least two fingers, wherein the distance of separation between said two fingers is configurable;
 c. moving said end effector to a plurality of locations using a first rotary arm connected to a second rotary arm, wherein said second rotary arm is connected to said end effector, and said first and second rotary arms rotate about axes that are parallel to each other;
 d. moving said first rotary arm to two or more heights using a height arm connected to said first rotary arm, whereby said robot can pick up, hold and drop off said dish.

* * * * *